FIG. 1

INVENTORS
THOMPSON MORRISON
RICHARD A. CARR
BY
ATTORNEYS

Sept. 13, 1960 T. MORRISON ET AL 2,952,402
AIR DELIVERY APPARATUS
Filed Jan. 14, 1958 5 Sheets-Sheet 2

INVENTORS
THOMPSON MORRISON
RICHARD A. CARR
BY Hudson Boughton,
Williams, David & Hoffmann
ATTORNEYS Sept. 13, 1960 T. MORRISON ET AL 2,952,402
AIR DELIVERY APPARATUS
Filed Jan. 14, 1958 5 Sheets-Sheet 3

INVENTORS
THOMPSON MORRISON
RICHARD A. CARR
BY Hudson, Boughton
Williams, David & Hoffmann
ATTORNEYS Sept. 13, 1960  T. MORRISON ET AL  2,952,402
AIR DELIVERY APPARATUS
Filed Jan. 14, 1958  5 Sheets-Sheet 4

INVENTORS
THOMPSON MORRISON
RICHARD A. CARR
BY
Hudson, Boughton
Williams, David & Hoffmann
ATTORNEYS

INVENTORS
THOMPSON MORRISON
RICHARD A. CARR
BY
ATTORNEYS

United States Patent Office 2,952,402
Patented Sept. 13, 1960

2,952,402

AIR DELIVERY APPARATUS

Thompson Morrison, Shaker Heights, and Richard A. Carr, Cleveland, Ohio, assignors to Morrison Products, Inc., Cleveland, Ohio, a corporation of Ohio Filed Jan. 14, 1958, Ser. No. 708,860

13 Claims. (Cl. 230—114)

This invention relates to air delivery apparatus and, more particularly, to apparatus of this kind by which different air supply volumes are obtainable as needed.

The delivery apparatus of the present invention is applicable to various uses and installations where different volumes of air are needed at different times as, for example, in the field of heating and air conditioning. One specific instance of such a need is for a southern or moderate climate where it is desirable to have a moderate volume of air supplied to an air distribution system for hot-air heating purposes during cool or cold weather and a larger volume of air supplied to the system for cooling purposes during hot weather. Conversely, the invention also fulfills a specific need for northern climates where it may be desirable to have a large volume of air supplied to an air distribution system for heating purposes in winter weather and a relatively smaller volume of air for cooling purposes during summer weather.

As its principal object, the present invention accordingly provides novel air delivery apparatus of a simple and practical form which is readily adaptable to different volumes of air supply needed at different times by the selective positioning of a control damper, the invention preferably assuming the form of a variable-volume blower unit.

Another object is to provide novel air delivery apparatus comprising a damper movable to different air passage control positions, namely an open position to which the damper is movable by the air flow and a restrictive position to which the damper is movable by a biasing means, and also comprising means for releasably holding the damper in the restrictive position.

Still another object is to provide air delivery apparatus of the character just above indicated and which includes electrically energizable means for causing actuation of the holding means.

A further object is to provide a novel variable-volume blower unit having a variable-position damper in the air delivery passage thereof, and means for automatically attaining the different desired damper positions for thus enabling the blower unit to be used as a dual-purpose unit for supplying air to an installation which requires substantially different volumes of air at different times.

Yet another object is to provide such novel variable-volume air delivery apparatus in which the apparatus can be adapted to the different air volumes needed by the mere actuation, preferably a manual actuation, of a selector switch.

Additionally, this invention provides novel air delivery apparatus of the kind above referred to in which the holding means for the damper comprises cooperating cam and relay components.

Other objects and advantages of this invention will be apparent in the following detailed description and in the accompanying drawings forming a part of this specification and in which.

Figure 1:
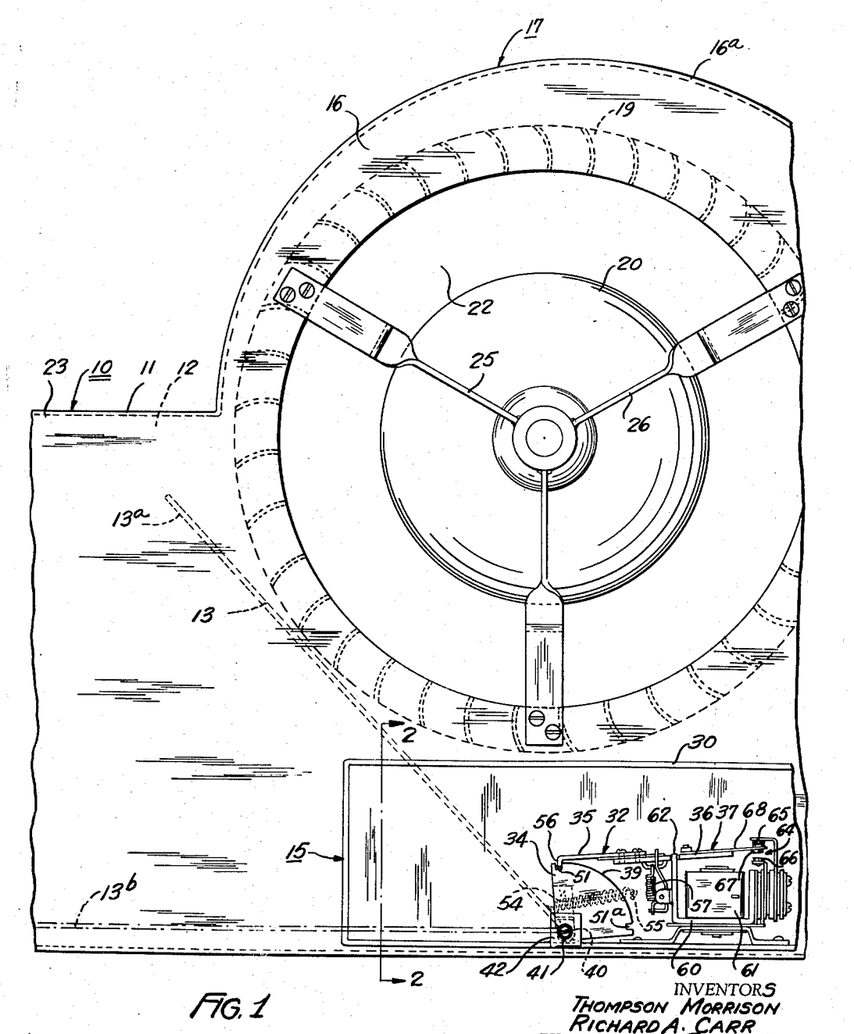
Fig. 1 is an elevational view showing the air delivery apparatus of the present invention in the form of a variable-volume blower unit.
Figure 2:
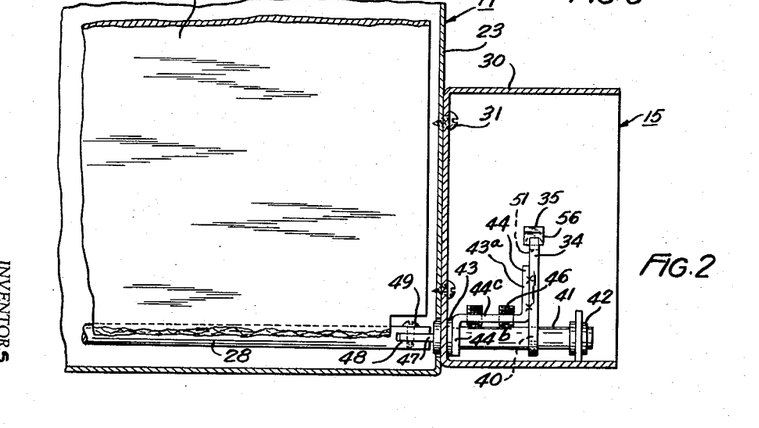
Fig. 2 is a partial transverse section taken on section line 2—2 of Fig. 1.

As one practical embodiment of this invention, Figs. 1 and 2 show air delivery apparatus 10 comprising a conduit member 11 having a passage 12 for a forced flow of air therethrough, and a damper 13 movable to different positions relative to the passage 12 for controlling the air flow through the latter. The air delivery apparatus 10 also comprises damper position control means 15 which will be described hereinafter.

The conduit member 11 is here shown as being the delivery nozzle portion of a blower housing 16 which forms one component of a variable-volume blower unit 17. The variable-volume blower unit also comprises a centrifugal blower wheel 19 located in a scroll-shaped portion 16ª of the blower housing, and a driving motor 20 suitably connected with the blower wheel.

The blower housing 16 is provided with a suitable air inlet opening, such as the opening 22 located in the side wall 23 which is common to the scroll-shaped portion 16ª and to the conduit member 11. The driving motor 20 is here shown as being located in or adjacent the air inlet opening 22 and supported on the blower housing 16 by bracket means 25 having radial arms 26 attached to the blower housing.

The damper 13 is movable to different control positions relative to the passage 12, as by being swingable in the latter from a restrictive position 13ª to an open position 13ᵇ, and vice versa. For the purpose of such swinging thereof the damper 13 is mounted on a pivot shaft 28. The open position 13ᵇ of the damper is a substantially full-open position in which the passage 12 is relatively unobstructed for a large or maximum volume of air delivery therethrough, and the position 13ª is a restrictive position in which the damper extends part way across the passage 12 and decreases the air delivery therethrough to moderate or minimum air volume.

The damper position control means 15 comprises a supporting and enclosing housing 30 mounted on the common side wall 23, as by means of suitable fasteners 31, and holding mechanism 32 located in the housing 30. The holding mechanism 32 comprises cooperating members 34 and 35 of which the member 34 is connected with the damper 13 for movement therewith, and the member 35 is a holding or latch member for holding cooperation with the member 34 and is here shown as being actuatable by the armature 36 of an electromagnetic relay 37.

The member 34 of the holding mechanism 32 is here shown as being a sector-shaped member or cam having an arcuate free outer edge 39 and an inner corner portion 40 mounted on a support shaft 41 which extends through an opening of such corner portion. The shaft 41 is a stub shaft which is in alignment with the pivot shaft 28 of the damper 13 and is rotatably supported by a pair of spaced bearing members 42 and 43 provided on the housing 30. The sector member 34 includes a bracket arm 44 having its deflected outer end 44ᵃ attached, as by welding, to a side face of the sector member and having its deflected inner end 44ᵇ provided with an opening through which the shaft 41 extends. The intermediate portion 44ᶜ extends along the shaft 41 and carries one or more set screws 46 for clamping engagement with the shaft.

From the mounting of the sector member 34 as just above described, it will be seen that this member is pivotally supported by the shaft 41 but is angularly adjustable to different clamped positions on this shaft by means of the set screws 46.

The inner end of the shaft 41 extends through the rear wall of the housing 30 and through an opening of the common wall 23, and is provided with an axially projecting flat blade portion 47. The adjacent end of the pivot shaft 28 of the damper 13 is provided with a slot 48 in which the blade extension 47 of the shaft 41 is engaged and retained by a transverse screw 49. The damper 13 is thus pivotally supported by the shaft 41 and is connected by the latter to the sector member 34 so that the sector member will be swingable with the damper.

The sector member 34 is provided with stop means which is engageable by the holding member 35 and which stop means is here shown as comprising a stop recess 51 formed in the free arcuate edge 39. A second such stop recess 51ᵃ is preferably provided in the arcuate edge 39 in a substantially 90 degree spaced relation to the recess 51. The provision of two such stop recesses in the sector member 34 adapts the control means 15 for either right- or left-hand mounting on the conduit member 11.

The damper 13 is movable to one of its control positions, in this instance its open position 13ᵇ, by the forced air flow in the passage 12 which in this case is the air delivery of the blower unit 17. The damper is movable to another control position, in this instance its restrictive position 13ᵃ, by a biasing means which is here shown as comprising a tension spring 54 having one end thereof attached to the damper or to the sector member and its other end secured to an anchor pin or the like, 55. The spring 54 continuously biases the damper toward the restrictive position 13ᵃ and its pulling force is sufficient to move the damper to the restrictive position whenever the blower unit 17 is stopped by deenergization of the driving motor 20.

The holding member 35 of the damper positioning means 15 includes a hook portion or latch finger 56 which ridingly cooperates with the arcuate edge 39 of the sector member 34 and is engageable in the recess 51 of the latter for holding the damper 13 in its restrictive position 13ᵃ. The impact force of the air flow against the damper 13 is sufficient to move the damper to its open position 13ᵇ, in opposition to the spring 54, whenever the blower unit 17 is being operated by the energization of the motor 20, provided that the finger 56 has been disengaged from the recess 51 of the sector member 34. The finger 56 is normally biased toward riding contact with the arcuate edge 39 of the sector member 34 and toward engagement in the recess 51 by a tension spring 57 forming a part of the relay 37.

From the construction of the damper control means 15 as thus far described it will be seen that, whenever the blower unit 17 is in operation and the damper 13 is in its open position 13ᵇ, a maximum volume of air will be delivered through the passage 12 but as soon as the blower unit is stopped, the damper will be moved to its restrictive position 13ᵃ by the spring 54, and the finger 56 will thereupon be automatically engaged in the recess 51 to hold the damper in the restrictive position such that when the blower unit 17 is restarted, the air delivery through the passage 12 will be a reduced amount or minimum volume. The damper 13 will be retained in its restrictive position 13ᵃ by the cooperating stop and holding members 34 and 35 until such time as the finger 56 is disengaged from the recess 51 whereupon the damper 13 will be swingable to its open position by the air flow of the passage 12.

The relay 37 comprises a suitable magnet frame 60 and a magnet coil 61 thereon for energizing the same to actuate the armature 36 in opposition to the spring 57. The magnet frame 60 includes suitable fulcrum means 62 for swingable supporting the armature 36. The relay 37 also includes automatic sequence switch means 64 comprising spaced stationary switch contacts 65 and 66 and a movable double-faced contact 67 carried by a resilient arm extension 68 of the armature 36.

The contact 67 is located between the stationary contacts 65 and 66 and is selectively engageable with the latter by swinging of the armature 36, such that the pair of contacts 65 and 67 constitute one control switch and the pair of contacts 66 and 67 constitute another control switch. The switch comprising the contacts 65 and 67 can be referred to as the upper sequence switch and the switch comprising the contacts 66 and 67 can be referred to as the lower sequence switch.

Figure 3:
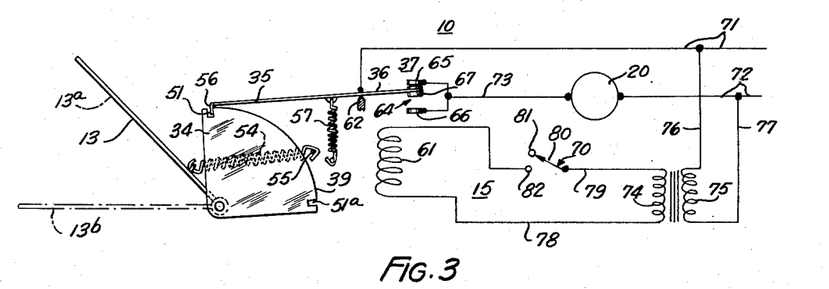
Figs. 3 to 5 inclusive are diagrammatic views representing different operating conditions of the apparatus of Fig. 1.
Figure 4:
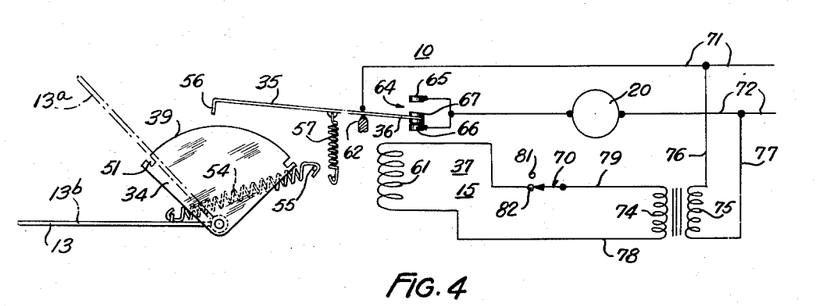
Figure 5:
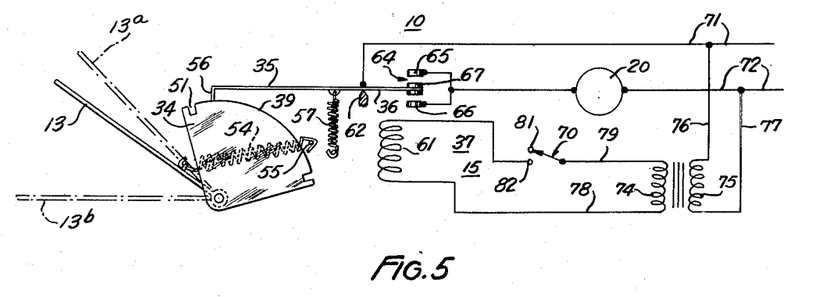

The damper control means 15 also includes energizing circuit means for the blower driving motor 20 and for the relay 37, and which circuit means is illustrated in the operational diagrams of Figs. 3, 4 and 5. The damper control means 15 additionally includes selector switch means 70 located in the energizing circuit means just referred to. As shown in Fig. 3, the energizing circuit means of the damper control means 15 comprises current supply conductors 71 and 72, of which the supply conductor 71 is connected with the common or double-faced movable contact 67 of the relay 37. The other supply conductor 72 is connected with one terminal of the drive motor 20 and the other terminal of the motor is connected with the two stationary contacts 65 and 66 of the relay 37 by a conductor 73.

The magnet coil 61 of the relay 37 is energizable from the line conductors 71 and 72, or from any other suitable power source, and is here shown as being energizable from a transformer 74 which has its primary winding 75 connected with the line conductors 71 and 72 by conductors 76 and 77. The terminals of the magnet coil 61 are connected with the secondary transformer winding 74 by conductors 78 and 79 and the energization of the magnet coil is controlled by having the selector switch 70 located in the latter conductor.

The selector switch 70 is here shown as being a manually operable switch, but the same may be operated in any suitable manner. The selector switch 70 has a movable switch member 80 whose open position is represented by the dead contact 81 for deenergizing the magnet coil 61 and its closed position in engagement with the contact 82 for energizing the magnet coil.

In the energizing circuit means above described it will be seen that the selector switch 70 controls the energization of the magnet coil 61 of the relay 37, and the upper and lower sequence switches 65, 67 and 66, 67 control the operation of the blower driving motor 20. In Figs. 3, 4 and 5 the open position of the selector switch 70, in which the contact member 80 is in engagement with the dead contact 81, corresponds with the condition of the apparatus when the reduced volume of air is being called for, and the closed position with the contact member 80 in engagement with the contact 82 corresponds with the condition in which a maximum air delivery is being called for.

The operation of the air delivery means 10 will now be described with reference to the diagrams of Figs. 3, 4 and 5. The open position of the selector switch 70 as shown in Fig. 3 corresponds with the condition of the air delivery means 10 in which the motor 20 is energized by reason of the closed condition of the contacts 65 and 67 of the upper sequence switch and the damper 13 is being held in its restrictive position 13ª by the holding member 35. Under these conditions, the air delivery through the passage 12 is the reduced or minimum volume which might be desirable in a southern or moderate climate for a hot air heating system during cool or cold weather, or which might be desirable in a northern climate for cooling purposes in hot weather. At this time, the magnet coil 61 of the relay 37 is deenergized and the holding member 35 is being retained in holding engagement with the notch or recess 51 of the sector member 34 by the tension spring 57.

When the increased or maximum volume of air delivery through the passage 12 is desired or called for, the selector switch 70 is in its closed position shown in Fig. 4 whereupon the magnet coil 61 is energized from the transformer winding 74 and shifts the switch contact 67 to the closed condition of the lower sequence switch of the relay to thereby maintain or reestablish the energized condition of the motor 20. The energization of the relay coil 61 causes the holding member 35 to be disengaged from the recess 51 of the sector member 34 to thereby permit the air flow in the passage 12 to swing the damper 13 to its open position 13ᵇ. As long as the selector switch 70 is retained in its closed position of Fig. 4, the damper 13 will be held in its open position by the air flow and the air delivery through the passage 12 will be the desired increased or maximum volume such as would be desirable in a southern or moderate climate for cooling purposes during hot weather, or which would be desirable in a northern climate for hot air heating purposes during winter weather.

The diagram of Fig. 5 illustrates the condition of the air delivery apparatus 10 when the selector switch 70 has just been shifted from its closed position of Fig. 4 back to its open position. The reopening of the selector switch 70 deenergizes the magnet coil 61 to permit the spring 57 to move the finger 56 of the holding member 35 into riding engagement with the arcuate edge or cam portion 39 of the sector member 34. At this time, the movable contact 67 of the sequence switch means is in an intermediate position in which the upper and lower sequence switches are both open. The drive motor 20 will therefore be deenergized and the interruption in the air flow through the passage 12 will permit the damper 13 to be swung toward its restrictive position by the spring 54. When the damper arrives at its restrictive position, the finger 56 will drop into the recess 51 whereupon the upper sequence switch will be reclosed by the engagement of the contact 67 with the stationary contact 65 as illustrated in Fig. 3, and the drive motor 20 will thereupon be restarted and the subsequent air delivery through the passage 12 will again be the reduced or minimum volume.

Figure 6:
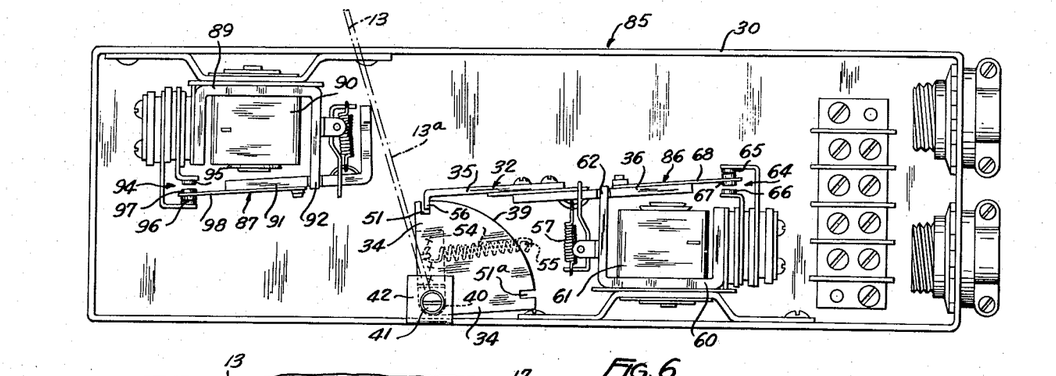
Fig. 6 is an elevational view showing a modified form of the damper position control means of the present invention.

Fig. 6 of the drawings shows a modified form of damper control means 85 which is usable in the same relation to the damper 13 of the air delivery apparatus 10 as the above-described damper control means 15. The control means 85 differs from the control means 15 in that it employs two relays 86 and 87, of which the relay 86 is identical with the relay 37 and functions in a similar manner. The control means 85 is also similar to the control means 15 in that it employs the same sector member or cam 34 and holding member 35. To the extent that the components of the control means 85 correspond with those of the control means 15, the same reference characters have been applied thereto.

The relay 87 of the damper control means 85 comprises a suitable magnet frame 89 carrying a magnet coil 90, and an armature 91 responsive to the magnet coil and swingably mounted on the frame 89 by a suitable fulcrum 92. The relay 87 also includes an automatic switch means 94 comprising spaced stationary contacts 95 and 96, and a double-faced movable contact 97 operable therebetween and carried by a flexible arm extension 98 of the armature 91. The automatic switch means 94 is a selector switch means of which the pair of cooperating contacts 95 and 97 form an upper selector switch and the pair of cooperating contacts 96 and 97 form a lower selector switch. The energizing circuit means for the drive motor 20 and the relays 86 and 87 is illustrated in the operational diagrams of Figs. 7 to 10 inclusive and will now be described by reference to the diagram of Fig. 7.

Figure 7:
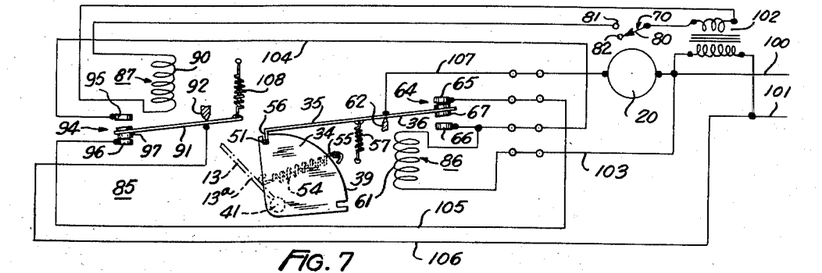
Figs. 7 to 10 inclusive are diagrammatic views representing different operating conditions of the control means of Fig. 6.

This energizing circuit means includes line conductors 100 and 101, of which the conductor 100 is connected with one of the terminals of the drive motor 20 and the conductor 101 is connected with the movable contact 97 of the relay 87. The magnet coil 90 of the relay 87 is energizable from a suitable source of current and is controlled by a selector switch 70 corresponding with the same selector switch of the air delivery apparatus 10. The energizing current for the relay coil 90 is here shown as being obtainable from the line conductors 100 and 101 through a transformer 102.

The magnet coil 61 of the relay 86 has one end thereof connected with the line conductor 100 by a conductor 103. The other end of this coil is connected with the stationary switch contact 66 and is also connected with the stationary switch contact 95 of the relay 87 through a conductor 104. The stationary contact 65 of the relay 86 is connected with the stationary contact 96 of the relay 87 by conductor 105. The line conductor 101 is connected with the movable contact 97 of the relay 87 by a conductor 106, and the movable contact 67 of the relay 86 is connected with the other terminal of the drive motor 20 by a conductor 107.

From the energizing circuit connections just described for the damper control means 85, it will be seen that when the selector switch 70 is in its open position of Fig. 7, the magnet coil 90 will be deenergized and the lower selector switch 96, 97 of the relay 87 will be in its closed position by reason of the action of the tension spring 108 of this relay. Assuming that the damper 13 is in its restrictive position 13ª at this time, the holding member 35 will be engaged in the recess 51 of the sector member 34 and contact 67 will be in engagement with the contact 65 to produce a closed condition of the upper sequence switch of the relay 86.

By reason of the closed condition of the lower selector switch 96, 97 of the relay 87 and the upper sequence switch 65, 67 of the relay 86, the drive motor 20 will be energized from the line conductors 100 and 101. The operation of the blower unit 17 by the energization of the motor 20 while the damper 13 is thus being held in its restrictive position 13ª by the holding member 35 results in the delivery of the reduced or minimum volume of air through the passage 12.

Figure 8:
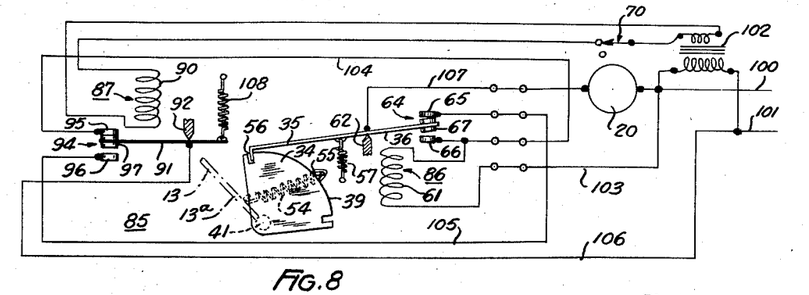

When the selector switch 70 is moved to its closed position shown in Fig. 8, the magnet coil 90 will be energized to cause opening of the lower selector switch 96, 97 of the relay 87 and closing of the upper selector switch 95, 97 of this relay. Fig. 8 shows the condition of the control means 85 when such energization of the magnet coil 90 has just taken place but with the holding member 35 still engaged in the recess 51 of the sector member 34. The opening of the lower selector switch of the relay 87 causes a temporary deenergization of the drive motor 20 whereupon the impact of the air delivery against the damper 13 will be temporarily removed.

Figure 9:
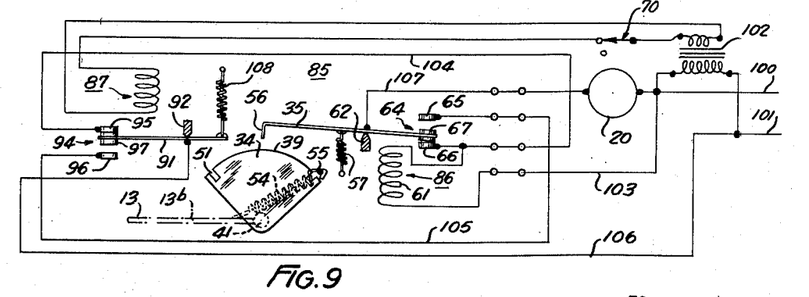

The closing of the upper selector switch of the relay 87 causes closing of the energizing circuit of the magnet coil 61 of the relay 86. The removal of the air impact from the damper 13, as just above mentioned, permits the holding member 35 to be readily disengaged from the recess 51 by the pull of the magnet coil 61 on the armature 36 of the relay 86. This same movement of the armature 36 causes shifting of the automatic switch means of the relay 86 to the condition where the upper sequence switch 65, 67 of this relay is opened and the lower sequence switch 66, 67 is closed, as shown in Fig. 9. The closing of the lower sequence switch reestablishes the energizing circuit for the driving motor 20, whereupon the operation of the blower unit 17 causes swinging of the damper 13 to its open position 13$^b$ by the air flow in the passage 12 and the air delivery through this passage will then be the increased or maximum volume.

Figure 10:
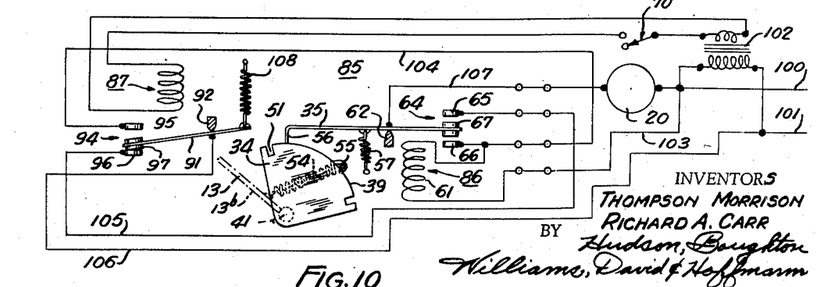

The diagram of Fig. 10 shows the condition of the damper control means 85 when the selector switch 70 has just been moved from its closed position of Fig. 9 to its open position and shows the lower selector switch 96, 97 of the relay 87 closed by the spring 108 by reason of the resulting deenergization of the magnet coil 90. The corresponding opening of upper selector switch 95, 97 deenergizes the magnet coil 61 of the relay 86, thereby permitting the spring 57 to pull the finger 56 down into riding engagement with the arcuate edge 39 of the sector member 34 as shown in Fig. 10.

At this time the movable contact 67 of the automatic sequence switch means of the relay 86 will be in an intermediate position in which the drive motor 20 will be temporarily deenergized. This deenergization of the drive motor causes the impact force of the delivery air to be removed from the damper 13 whereupon the damper will be swung back to its restrictive position 13$^a$ by the spring 54 and the finger 56 will then drop into the recess 51. The dropping of the finger 56 into the recess 51 permits the spring 57 to close the upper sequence switch 65, 67 of the relay 86 to reestablish the energizing circuit for the motor 20.

From the above-described operation of the damper control means 85 it will be seen that the energization of the drive motor 20 is so controlled that the air delivery of the blower 17 will be interrupted at the particular time when the finger 56 is to be moved into or out of the recess 51 so that the air impact against the damper will be temporarily removed and there will be no tendency for binding to occur between the finger and the sector member 34 at the time of such engagement or disengagement. It will also be seen that in the modified apparatus 85 illustrated in Figs. 6 to 10 inclusive the open position of the selector switch 70 corresponds with the condition of the apparatus in which the reduced volume of air delivery is being called for, such as would be suitable in a southern or moderate climate for hot air heating purposes, and the closed position of the selector switch 70 corresponds with the condition of the apparatus in which the maximum air delivery is being called for, such as would be desirable in southern or moderate climates for cooling purposes in hot weather.

Figure 11:
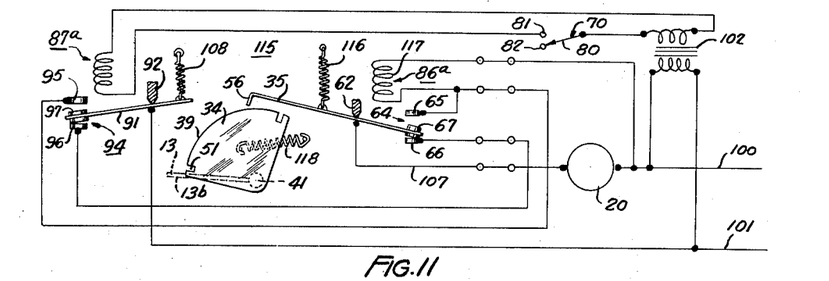
Figs. 11 and 12 are diagrammatic views similar to those of Figs. 7 and 9 but showing another modified construction.
Figure 12:
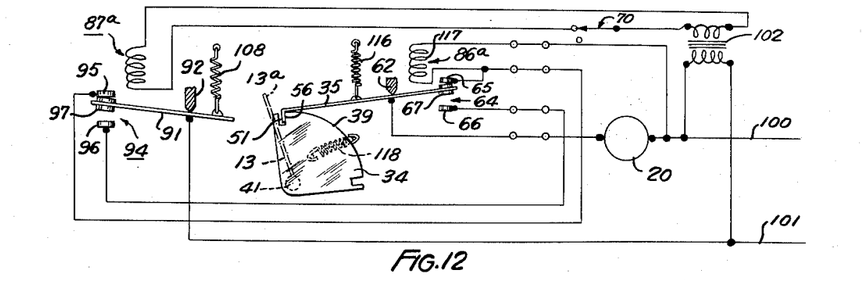

Figs. 11 and 12 of the drawings show another modified form of air delivery apparatus 115 which is similar to that of Figs. 6 and 7, but in which an open position of the selector switch 70, as shown in Fig. 11, corresponds with an operating condition providing the maximum volume air delivery, and a closed position of the selector switch, as shown in Fig. 12, corresponds with an operating condition providing the reduced or minimum volume air delivery. In the apparatus of Figs. 11 and 12 the action of the spring 116 of the relay 86$^a$ is to tend to disengage the finger 56 from the recess 51 of the sector member 34, and the coil 117 when energized moves the finger toward engagement in the recess. This is a reverse arrangement and functioning as compared with the relay 86 of Fig. 7.

The relay 87$^a$ of Figs. 11 and 12 is of the same form as the relay 87 of Fig. 7 but the circuit connections extending to the stationary contacts 95 and 96 of the automatic selector switch means 94 are somewhat different. As shown in Figs. 11 and 12, the damper return spring 118 can be attached to the sector member 34 instead of to the damper itself.

Figure 13:
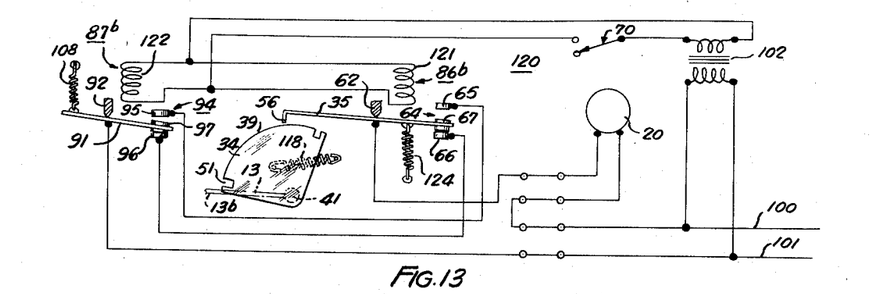
Figs. 13 and 14 are diagrammatic views similar to those of Figs. 7 and 9 but showing an additional modified construction.
Figure 14:
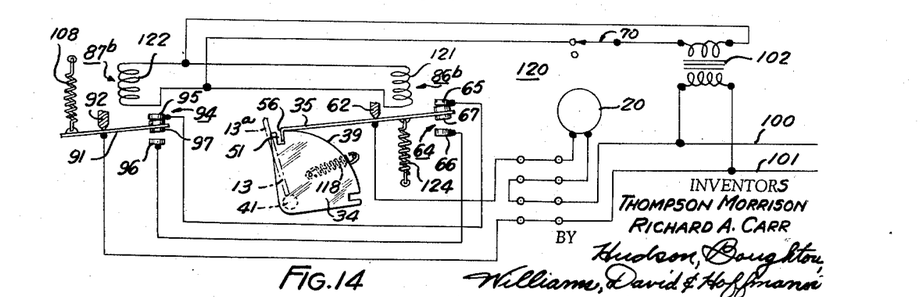

Figs. 13 and 14 show an additional modified form of air delivery apparatus 120 which is also similar to that of Figs. 6 and 7, but in which the magnet coils 121 and 122 of the relays 86$^b$ and 87$^b$ are both energizable by low voltage current supplied by a transformer 123. In the relay 86$^b$, the actions of the spring 124 and the magnet coil 121 are similar to those of the spring 116 and coil 117 of the relay 86$^a$ of Figs. 11 and 12, that is to say, the spring 124 tends to disengage the finger 56 from the recess 51, and the coil 121 when energized causes the finger to engage in the recess.

If desired, the relay 86$^b$ of the apparatus of Figs. 13 and 14 can be of the form shown in Fig. 4 in which the spring 57 urges the finger 56 toward engagement in the recess 51 and in which the energization of the coil 61 causes the finger to be disengaged from the recess. Likewise, if desired, the coils of both of the relays of the apparatus of Figs. 7 and 11 could be supplied with low voltage current from a single transformer in the manner shown for the relay coils 121 and 122 of Figs. 13 and 14.

From the accompanying drawings and the foregoing detailed description it will now be readily understood that this invention provides novel air delivery apparatus in which an automatic or semiautomatic control of a movable damper is obtained such that different control positions for the damper are established in accordance with a desired maximum or minimum volume of air delivery through an air passage. It will now also be readily understood that the air delivery apparatus of this invention and the damper control means disclosed therewith are of a relatively simple and practical construction and fulfill a need in housing and industry for obtaining a variable volume of air delivery through a given air passage in accordance with existing different air requirements. Additionally, it will be seen that this invention provides a novel variable-volume blower unit which is readily, and substantially automatically, adaptable from a condition of maximum air delivery to a condition of minimum air delivery, and vice versa.

Although the air delivery apparatus of this invention has been illustrated and described herein to a somewhat detailed extent, it will be understood, of course, that the invention is not to be regarded as being limited correspondingly in scope but includes all changes and modifications coming within the terms of the claims hereof.

Having described our invention, we claim:

1. In air delivery apparatus, means providing an air flow passage and including blower means in communication with said passage and operable to produce a flow of air therethrough, a driving motor connected with said blower means, a damper in said passage and movable to open and restrictive positions relative to said passage for controlling the air flow therethrough, biasing means connected with said damper and tending to move the same to said restrictive position, damper position control means including electrically energizable relay means and damper holding means responsive to said relay means and having an effective position for releasably holding said damper in said restrictive position, said damper being movable to said open position by said air flow in opposition to said biasing means when said damper has been released by said holding means, selector switch means, automatic switch means actuatable by said relay means, and energizing circuit means connected with said motor and relay means, said selector switch means and said automatic switch means being located in said circuit means and operable to control the energization of said relay means and motor.

2. Air delivery apparatus as defined in claim 1 in which said relay means comprises magnet coil means connected in circuit with, and controlled by, said selector switch means and said automatic switch means comprises motor control switch means connected in circuit with the motor for controlling the energization of said motor.

3. Air delivery apparatus as defined in claim 1 in which said relay means comprises first and second magnet coils and said automatic switch means comprises first and second automatic switch devices operatively associated respectively with and responsive to said first and second magnet coils, said first magnet coil being connected in circuit with and controlled by said selector switch means.

4. Air delivery apparatus as defined in claim 1 in which said relay means comprises first and second magnet coils and said automatic switch means comprises first and second automatic switch devices having pairs of switch contacts and being operatively associated respectively with and responsive to said first and second magnet coils, said first magnet coil being connected in circuit with and controlled by said selector switch means and said second magnet coil being connected in circuit with and controlled by contacts of said first automatic switch device, said motor being connected in circuit with and controlled by contacts of said first and second automatic switch devices.

5. In an air delivery apparatus, means defining an air passage and including blower means in communication with said passage for producing a flow of air through said passage; a driving motor connected with said blower means; a damper in said passage for controlling the flow of air therein and having a restrictive position and an open position; biasing means continuously effective on said damper tending to move the same toward said restrictive position; said damper being movable to said open position by said flow of air; damper position control means comprising co-operating members for releasably holding said damper against movement one of which members is connected with said damper for movement therewith and another of which is a movable holding member; said one member comprising a sector portion carrying a stop means and said holding member being co-operable with said sector portion and engageable with said stop means; motor control switch means connected with said movable holding member; electromagnetic means co-operable with said holding member to cause movement thereof to effective and ineffective positions for holding engagement with said stop means and for actuating said motor control switch means; and electric circuit means including selector switch means for controlling the energization of said electromagnetic means; said circuit means connecting said selector switch means, said electromagnetic means, said motor control switch means, and said driving motor such that operation of said selector switch means renders said damper position control means and said motor control switch means responsive to said electromagnetic means whereby said damper is selectively movable between said restrictive and said open positions.

6. Air delivery apparatus as defined in claim 5 in which said stop means comprises stop elements spaced apart arcuately of said sector portion and adapting said damper position control means for right and left hand installation.

7. Air delivery apparatus as defined in claim 5 in which the connection between said damper and said one member comprises adjustably cooperating portions providing for adjustment of the damper position relative to the engaged condition of said holding member with said stop means.

8. In air delivery apparatus, means providing an air flow passage and including blower means in communication with said passage and operable to produce a flow of air therethrough, a driving motor connected with said blower means, a damper in said passage and movable to open and restrictive positions relative to said passage for controlling the air flow therethrough, said damper being movable to said open position by said air flow, biasing means connected with said damper and tending to move the same to said restrictive position, damper position control means comprising cooperating members one of which is a sector member connected with said damper for movement therewith and having a stop element thereon and the other is a holding member cooperating with said sector member and engageable with said stop element for holding said damper in said restrictive position, spring means urging said holding member toward engagement with said stop element, relay means energizable to cause disengagement of said holding member from said stop element, energizing circuit means connected with said motor and relay means, selector switch means located in said circuit means and controlling the energization of said relay means, and automatic switch means located in said circuit means and responsive to said relay means for controlling the operation of said motor.

9. In air delivery apparatus, means providing an air flow passage and including blower means in communication with said passage and operable to produce a flow of air therethrough, a driving motor connected with said blower means, a damper in said passage and movable to open and restrictive positions relative to said passage for controlling the air flow therethrough, said damper being movable to said open position by said air flow, biasing means connected with said damper and tending to move the same to said restrictive position, damper position control means comprising cooperating members one of which is a sector member connected with said damper for movement therewith and having a stop element thereon and the other is a holding member cooperating with said sector member and engageable with said stop element for holding said damper in said restrictive position, spring means effective on said holding member and tending to disengage the same from said stop element, relay means energizable to cause engagement of said holding member with said stop element, energizing circuit means connected with said motor and relay means, selector switch means located in said circuit means and controlling the energization of said relay means, and automatic switch means located in said circuit means and responsive to said relay means for controlling the operation of said motor.

10. In air delivery apparatus, means providing an air flow passage and including blower means in communication with said passage and operable to produce a flow of air therethrough, a driving motor connected with said blower means, a damper in said passage and movable to open and restrictive positions relative to said passage for controlling the air flow therethrough, biasing means connected with said damper and tending to move the same to said restrictive position, damper position control means including electrically energizable relay means and damper holding means responsive to said relay means and having an effective position for releasably holding said damper in said restrictive position, said damper being movable to said open position by said air flow in opposition to said biasing means when said damper has been released by said holding means, said relay means comprising two relays each having a magnet coil and an automatic switch responsive to said magnet coil, a low voltage current supply, circuit means connecting the magnet coils of said relays with said low voltage supply, selector switch means located in said circuit means and controlling the energization of said magnet coils, and other circuit means connecting said motor with said current supply and controlled by the automatic switches of said relays.

11. In an air delivery apparatus, means defining an air passage and including blower means in communication with said passage for producing a flow of air through said passage; a driving motor connected with said blower means; a damper in said passage for controlling the flow of air therein and having a partially open position and a fully open position; spring biasing means continuously effective on said damper tending to move the same toward said partially open position; said damper being movable to said fully open position by said flow of air; holding means for releasably holding said damper in said partially open position against said flow of air comprising co-operating members one of which members is connected with said damper for movement therewith and which presents a stop means, and another of which members is a movable holding member biased to engage said stop means in holding cooperation to retain said damper in said partially open position; electromagnet means co-operable with said holding member for disengaging the same from said stop means; energizing circuit means connected with said electromagnet means and with said motor; a damper position selector switch means movable between first and second positions and located in said circuit means for controlling said electromagnet means; and automatic motor control switch means located in said circuit means and actuatable by said electromagnet means through said holding member to control the energization of said motors; said motor control switch means being movable to open-switch and closed-switch positions in succession upon disengaging and re-engaging movement of said holding member relative to said stop means, whereby, upon movement of said damper position selector switch means to its first position, it will cause energization of said electromagnet means to disengage said holding member and actuate said motor control switch means to closed-switch position and energize said motor to cause said air flow to move said damper to said fully open position, and whereby, upon movement of said damper position selector switch means to its second position, it will cause de-energization of said electromagnet means and actuation of said motor control switch means to open-switch position to disengage said motor to permit said spring means to move said damper to said partially open position and in which partially open position the spring-biased holding member will re-engage said stop means and actuate said motor control switch means to closed-switch position to re-energize said motor.

12. In air delivery apparatus, means providing an air flow passage and including blower means in communication with said passage and operable to produce a flow of air therethrough, a driving motor connected with said blower means, a damper in said passage and movable to different operative positions for controlling the flow of air through said passage, damper position control means comprising an electrically energizable relay means and a damper holding means responsive to operation of said relay means, selector switch means, control switch means actuatable by said relay means, and energizing circuit means connected with said motor and relay means, said selector switch means and said control switch means being located in said circuit means and operable to control the energization of said relay means and motor.

13. Air delivery apparatus as defined in claim 12 in which said relay means comprises first and second magnet coils and said control switch means comprises first and second automatic switch devices operatively associated respectively with, and responsive to, said first and second magnet coils, said first magnet coil being connected in circuit with, and controlled by, said selector switch means.

References Cited in the file of this patent

UNITED STATES PATENTS

| | | |
|---|---|---|
| 1,534,955 | Horak et al. | Apr. 21, 1925 |
| 2,079,157 | De Lin | May 4, 1937 |
| 2,181,523 | Shiels | Nov. 28, 1939 |
| 2,326,957 | Maguire | Aug. 17, 1943 |
| 2,439,271 | Shaver | Apr. 6, 1948 |
| 2,571,374 | Mayr | Oct. 16, 1951 |
| 2,591,216 | Thompson et al. | Apr. 1, 1952 |
| 2,638,106 | Shiels | May 12, 1953 |
| 2,688,460 | Borgerd | Sept. 7, 1954 |
| 2,846,180 | Kongelbeck | Aug. 5, 1958 |